(12) United States Patent
Fernsebner et al.

(10) Patent No.: US 11,593,437 B1
(45) Date of Patent: Feb. 28, 2023

(54) SYSTEM, METHOD, AND COMPUTER PROGRAM PRODUCT FOR IMPLEMENTING INTELLIGENT ELECTRONIC DESIGN REUSE THROUGH DATA ANALYTICS

(71) Applicant: Cadence Design Systems, Inc., San Jose, CA (US)

(72) Inventors: Daniel Konrad Fernsebner, Bellingham, MA (US); Vikas Kakkar, Noida (IN); Vikas Kohli, Noida (IN); Mark Joseph Hepburn, Pittsburgh, PA (US)

(73) Assignee: Cadence Design Systems, Inc., San Jose, CA (US)

( * ) Notice: Subject to any disclaimer, the term of this patent is extended or adjusted under 35 U.S.C. 154(b) by 305 days.

(21) Appl. No.: 16/691,800

(22) Filed: Nov. 22, 2019

(51) Int. Cl.
| | |
|---|---|
| *G06F 16/9038* | (2019.01) |
| *G06F 16/903* | (2019.01) |
| *G06F 30/31* | (2020.01) |
| G06F 111/02 | (2020.01) |
| G06F 115/08 | (2020.01) |
| G06F 111/04 | (2020.01) |

(52) U.S. Cl.
CPC .... *G06F 16/9038* (2019.01); *G06F 16/90335* (2019.01); *G06F 30/31* (2020.01); *G06F 2111/02* (2020.01); *G06F 2111/04* (2020.01); *G06F 2115/08* (2020.01)

(58) Field of Classification Search
CPC .... G06F 16/178; G06F 9/4881; G06F 16/219; G06F 16/9038; G06F 16/90335; G06F 30/31; G06F 2111/02; G06F 2111/04; G06F 2115/08
See application file for complete search history.

(56) References Cited

U.S. PATENT DOCUMENTS

| | | | |
|---|---|---|---|
| 9,323,644 B1* | 4/2016 | Hale | G06F 8/22 |
| 10,152,479 B1* | 12/2018 | Granström et al. | G06F 16/483 |
| 2006/0101368 A1* | 5/2006 | Kesarwani | G06F 30/30 |
| | | | 716/137 |
| 2006/0155691 A1* | 7/2006 | Lowe | G06F 16/90 |
| 2012/0233211 A1* | 9/2012 | Hassan | G06F 16/245 |
| | | | 707/770 |

(Continued)

*Primary Examiner* — Cam Y T Truong
(74) *Attorney, Agent, or Firm* — Mark H. Whittenberger; Holland & Knight LLP

(57) ABSTRACT

The present disclosure relates to a system and method for electronic design. Embodiments may include receiving, using at least one processor, a plurality of distinct electronic designs at an electronic design database and storing the plurality of distinct electronic designs at the electronic design database. Embodiments may further include receiving a request to reuse one of the plurality of distinct electronic designs from a client electronic device associated with a user, wherein the request includes design connectivity information, block connectivity information, and page connectivity information. Embodiments may also include analyzing the design connectivity information, block connectivity information, and page connectivity information to identify one or more closest matches with the plurality of distinct electronic designs and providing the one or more closest matches to the client electronic device to allow for subsequent displaying at a graphical user interface.

14 Claims, 12 Drawing Sheets

(56) References Cited

U.S. PATENT DOCUMENTS

| | | | |
|---|---|---|---|
| 2015/0324346 A1* | 11/2015 | Sankaran | G06F 16/25 |
| | | | 715/212 |
| 2016/0292801 A1* | 10/2016 | Quirico | G06Q 50/16 |
| 2019/0392105 A1* | 12/2019 | Irissou | G06F 30/33 |

* cited by examiner

SYSTEM, METHOD, AND COMPUTER PROGRAM PRODUCT FOR IMPLEMENTING INTELLIGENT ELECTRONIC DESIGN REUSE THROUGH DATA ANALYTICS

FIELD OF THE INVENTION

The present disclosure relates to intellectual property reuse systems, and more specifically, to implementing intellectual property reuse systems through data analytics.

DISCUSSION OF THE RELATED ART

Almost every new electronic design has circuitry that originates from past designs. Methodologies to implement reuse vary from basic replication to structured definition and managed storage of circuitry, design intent and implementation. The most widely used is copy and paste as it is a familiar use model with no teaching or process effort required but it comes at the cost of traceability. Copying something is not always advantageous as any latent issues that exist may also be copied. The inability to trace the source and destination of a copied circuit introduces risk that comes in many forms including, but not limited to, reliability, cost, time, compliance, schedule, functionality and manufacturability.

To address traceability electronic design automation ("EDA") vendors have introduced formalized methodologies that allow companies to create design intent, organize that design intent into hierarchical blocks of functionality and implementation, and enrich the reusable design intent with specialized properties to identify them as reuse blocks. The process used to create these blocks is tedious and removes the agile nature of copy and paste. It may be further limited by the static nature of the circuit due to how the blocks are managed. Most reuse circuits are modified to account for design requirements and constraints associated to the new design they are reused in. Formalized reuse assumes the circuit being applied is unchanged, which is often not the case. These limitations have hindered the adoption of formalized reuse.

SUMMARY

In one or more embodiments of the present disclosure a method for electronic design reuse is provided. The method may include receiving, using at least one processor, a plurality of distinct electronic designs at an electronic design database and storing the plurality of distinct electronic designs at the electronic design database. The method may further include receiving a request to reuse one of the plurality of distinct electronic designs from a client electronic device associated with a user, wherein the request includes design connectivity information, block connectivity information, and page connectivity information. The method may also include analyzing the design connectivity information, block connectivity information, and page connectivity information to identify one or more closest matches with the plurality of distinct electronic designs and providing the one or more closest matches to the client electronic device to allow for subsequent displaying at a graphical user interface.

One or more of the following features may be included. The design connectivity information, block connectivity information, and page connectivity information may be based upon, at least in part, a work in progress design associated with the user. Identifying one or more closest matches may be based upon, at least in part, one or more parts that are not located in the plurality of distinct electronic designs. Identifying one or more closest matches may be based upon, at least in part, page connectivity information that is not located in the plurality of distinct electronic designs. Displaying may include providing an option to accept or reject the one or more matches at the client electronic device. The method may include monitoring whether the one or more matches are accepted or rejected at the client electronic device. The method may further include updating the identification based upon, at least in part, the monitoring. The method may include allowing the user to provide feedback regarding the one or more matches at the graphical user interface. The method may also include updating the identification based upon, at least in part, the feedback.

In yet another embodiment of the present disclosure a computer-readable medium having stored thereon instructions that when executed by a processor result in one or more operations is provided. Operations may include receiving, using at least one processor, a plurality of distinct electronic designs at an electronic design database and storing the plurality of distinct electronic designs at the electronic design database. Operations may further include receiving a request to reuse one of the plurality of distinct electronic designs from a client electronic device associated with a user, wherein the request includes design connectivity information, block connectivity information, and page connectivity information. Operations may also include analyzing the design connectivity information, block connectivity information, and page connectivity information to identify one or more closest matches with the plurality of distinct electronic designs and providing the one or more closest matches to the client electronic device to allow for subsequent displaying at a graphical user interface.

One or more of the following features may be included. The design connectivity information, block connectivity information, and page connectivity information may be based upon, at least in part, a work in progress design associated with the user. Identifying one or more closest matches may be based upon, at least in part, one or more parts that are not located in the plurality of distinct electronic designs. Identifying one or more closest matches may be based upon, at least in part, page connectivity information that is not located in the plurality of distinct electronic designs. Displaying may include providing an option to accept or reject the one or more matches at the client electronic device. Operations may include monitoring whether the one or more matches are accepted or rejected at the client electronic device. Operations may further include updating the identification based upon, at least in part, the monitoring. Operations may include allowing the user to provide feedback regarding the one or more matches at the graphical user interface. Operations may also include updating the identification based upon, at least in part, the feedback.

In one or more embodiments of the present disclosure a system is provided. The system may include a computing device configured to receive, using at least one processor, a plurality of distinct electronic designs at an electronic design database. The computing device may be further configured to store the plurality of distinct electronic designs at the electronic design database. The computing device may be further configured to receive a request to reuse one of the plurality of distinct electronic designs from a client electronic device associated with a user, wherein the request includes design connectivity information, block connectivity information, and page connectivity information, the computing device further configured to analyze the design connectivity information, block connectivity information, and page connectivity information to identify one or more closest matches with the plurality of distinct electronic designs. The computing device may also be configured to provide the one or more closest matches to the client electronic device to allow for graphical display of the one or more closest matches.

One or more of the following features may be included. The design information, block information, and page connectivity information may be based upon, at least in part, a work in progress design associated with the user.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

A printed circuit board ("PCB") design may be viewed as a pattern of connected parts. The design, block and page connectivity information provides this pattern. Accordingly, embodiments of the present disclosure may be configured to analyze a designer's work in progress design and pattern match its design, block and page connectivity information with the designs in the company's design vault. The closest matches may be presented as suggestions for reuse. Companies want the simplicity of copy and paste, with the control and management of formalized reuse, and a process that supports full circuit genealogy traceability regardless if the reused instance has been modified or not.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Figure 1:
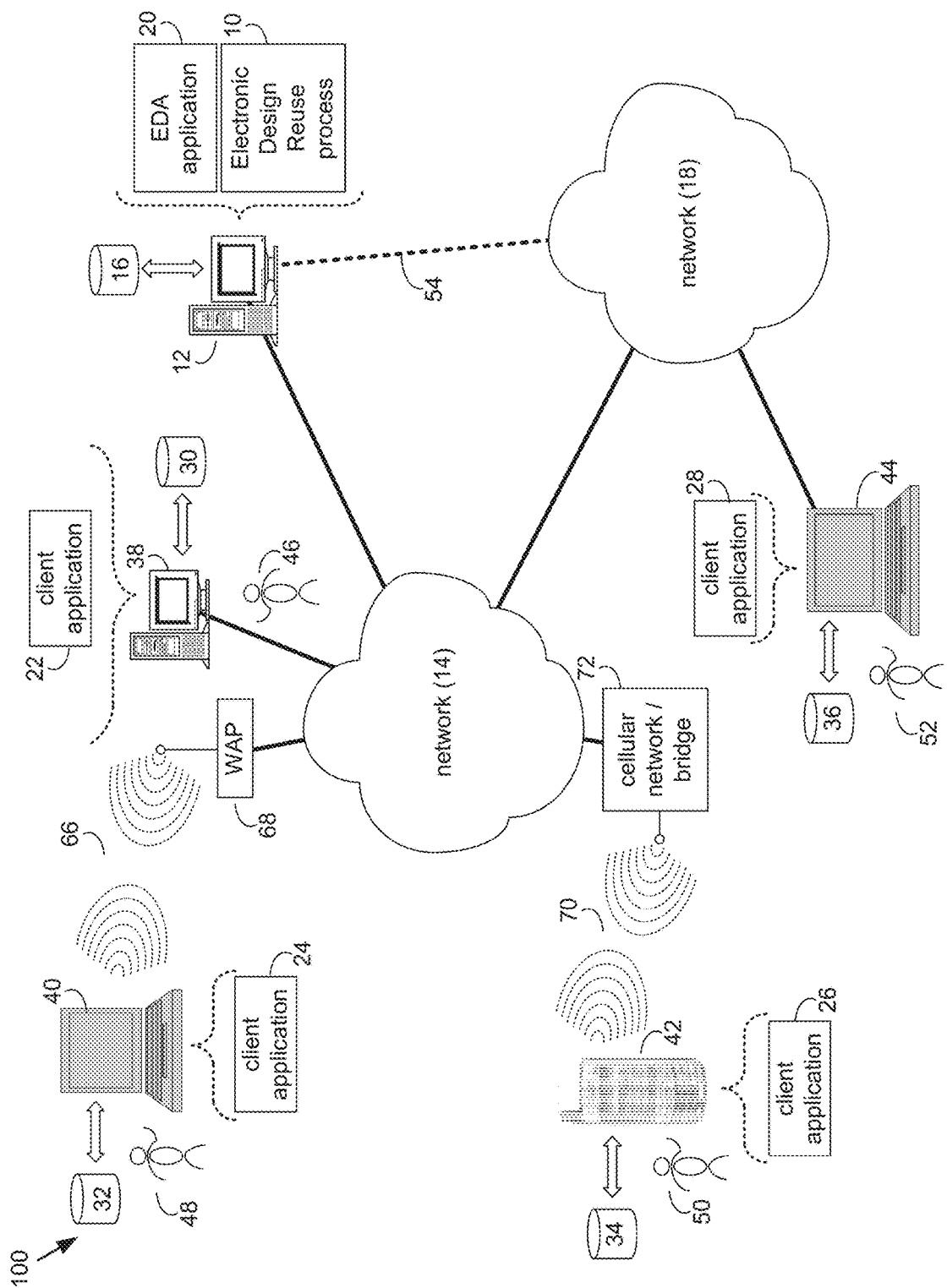
FIG. 1 is a diagram depicting an embodiment of a system in accordance with the present disclosure.

Referring to FIG. 1, there is shown electronic design reuse process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer, Amazon EC2 (or similar cloud hosting). Process 10 may also leverage any combination of AWS webservices and scalable compute. Server computer 12 may be a web server (or a series of servers) running a network operating system, examples of which may include but are not limited to: Microsoft® Windows® Server; Novell® NetWare®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, electronic design reuse process 10 may reside on and be executed, in whole or in part, by a client electronic device, such as a personal computer, notebook computer, personal digital assistant, or the like.

The instruction sets and subroutines of the electronic design reuse process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types.

Server computer 12 may execute a web server application, examples of which may include but are not limited to: Microsoft IIS, Novell Webserver™, or Apache® Webserver, that allows for HTTP (e.g., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Server computer 12 may execute an electronic design automation (EDA) application (e.g., EDA application 20), examples of which may include, but are not limited to those available from the assignee of the present application. EDA application 20 may interact with one or more EDA client applications (e.g., EDA client applications 22, 24, 26, 28) for electronic design optimization.

Electronic design reuse process 10 may be a standalone application, or may be an applet/application/script that may interact with and/or be executed within EDA application 20. In addition/as an alternative to being a server-side process, the design reuse process may be a client-side process (not shown) that may reside on a client electronic device (described below) and may interact with an EDA client application (e.g., one or more of EDA client applications 22, 24, 26, 28). Further, the design reuse process may be a hybrid server-side/client-side process that may interact with EDA application 20 and an EDA client application (e.g., one or more of client applications 22, 24, 26, 28). As such, the processes may reside, in whole, or in part, on server computer 12 and/or one or more client electronic devices.

The instruction sets and subroutines of EDA application 20, which may be stored on storage device 16 coupled to server computer 12 may be executed by one or more processors (not shown) and one or more memory modules (not shown) incorporated into server computer 12.

The instruction sets and subroutines of EDA client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access EDA application 20 and may allow users to e.g., utilize electronic design reuse process 10.

Users 46, 48, 50, 52 may access EDA application 20 directly through the device on which the client application (e.g., client applications 22, 24, 26, 28) is executed, namely client electronic devices 38, 40, 42, 44, for example. Users 46, 48, 50, 52 may access EDA application 20 directly through network 14 or through secondary network 18. Further, server computer 12 (e.g., the computer that executes EDA application 20) may be connected to network 14 through secondary network 18, as illustrated with phantom link line 54. Some or all of the operations discussed herein with regard to electronic design reuse process 10 may be performed, in whole or in part, in the cloud as a cloud-based process including, for example, networks 14, 18 and any others.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (e.g., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (e.g., CSMA/CA) for path sharing. The various 802.11x specifications may use phase-shift keying (e.g., PSK) modulation or complementary code keying (e.g., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

Figure 2:
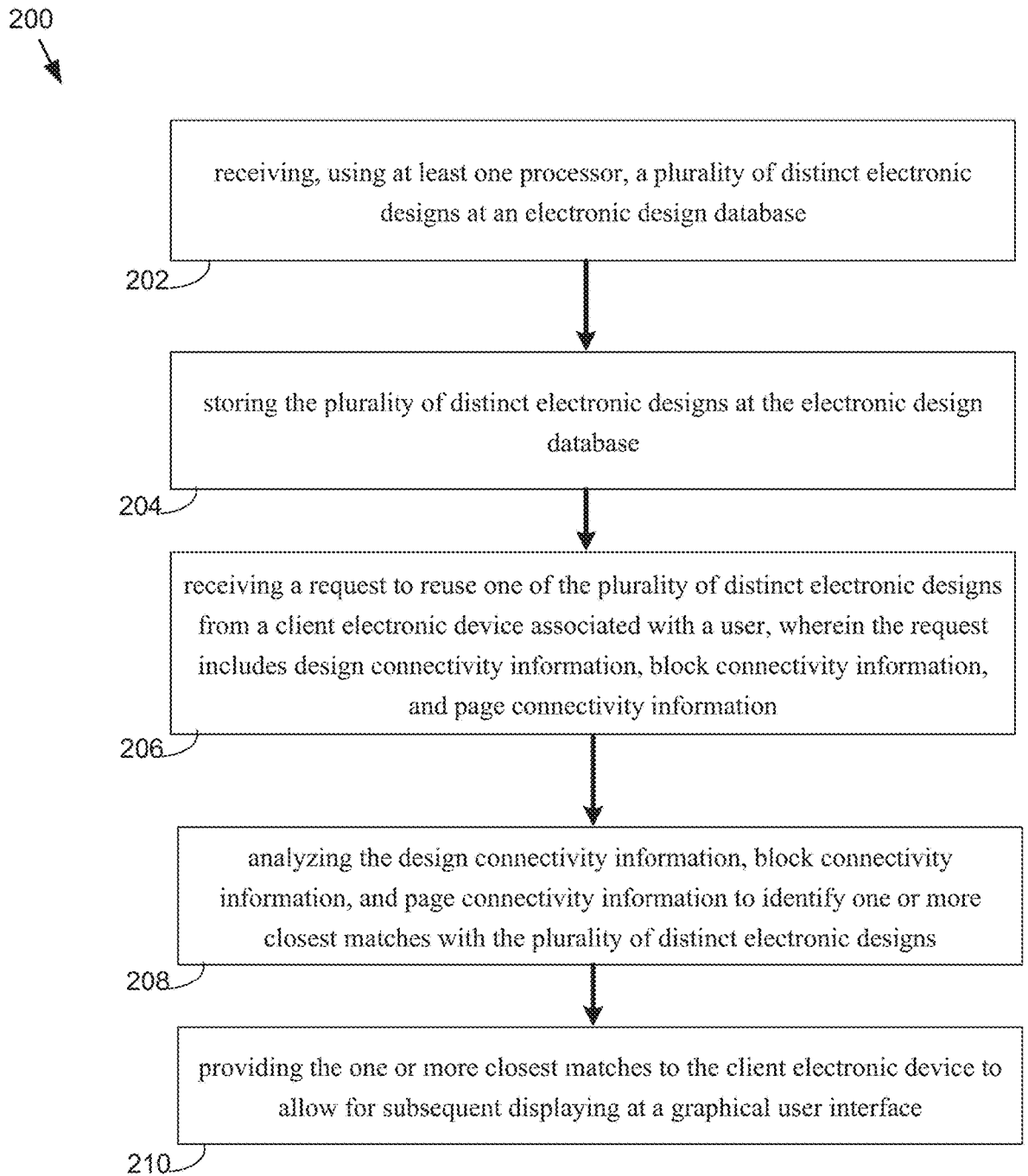
FIG. 2 is a flowchart depicting operations consistent with the electronic design reuse process in accordance with an embodiment of the present disclosure.

Referring now to FIG. 2, an example flowchart depicting operations consistent with an embodiment of electronic design reuse process 10 is provided. The process may include receiving (202), using at least one processor, a plurality of distinct electronic designs at an electronic design database and storing (204) the plurality of distinct electronic designs at the electronic design database. The process may further include receiving (206) receiving a request to reuse one of the plurality of distinct electronic designs from a client electronic device associated with a user, wherein the request includes design connectivity information, block connectivity information, and page connectivity information. The process may also include analyzing (208) the design connectivity information, block connectivity information, and page connectivity information to identify one or more closest matches with the plurality of distinct electronic designs and providing (210) the one or more closest matches to the client electronic device to allow for subsequent displaying as suggestions for IP reuse at a graphical user interface. Numerous other operations are also within the scope of the present disclosure.

A printed circuit board ("PCB") design can be viewed as a pattern of connected components. In some embodiments, if a designer's current work-in-progress ("WIP") design/page is viewed as a pattern, then "patterns" (e.g., designs (e.g. physical circuitry/PCB layout designs), blocks, pages, etc.) that are closer to the current WIP design/block/page may be extracted from the company's design database, and meaningful relevant portions of these may be suggested for IP reuse to the designer. For example, if a company makes cell phones, personal computers ("PCs") and watches, and if a designer is working on a cell phone, and is currently creating a circuit which involves an interrupt controller, they may be presented with circuits from existing cell phone designs as suggestions that involve an interrupt controller type part. The designer may then view how the interrupt controller was used in existing cell phone designs and reuse the existing circuit. The designer may be provided with multiple suggestions that would be ordered by the proximity of the design intent of the database designs to the current WIP design and page.

Embodiments of the present disclosure provide an "intelligent" IP reuse functionality in EDA applications that provides IP suggestions based on the content of the designer's current WIP design. Furthermore, embodiments of the present disclosure may also provide a system that may provide IP suggestions from existing designs, even if the designer is using parts/connectivity that have never previously been used in any of the stored electronic designs.

In some embodiments, electronic design reuse process 10 may provide traceability of reused IP regardless of change. The process may also learn from previous IP reuse activity by the designer community and may be configured to fine tune its IP suggestions based on such information. The process may also allow designers to provide feedback (e.g., comments/likes/dislikes) on various portions of an electronic design. Some portions may include, but are not limited to, designs, blocks, pages, parts, etc. in the company's design database and fine tune its IP suggestions (e.g., how used, where used, searches, etc.) based on prior designer feedback. The process may also access existing library data and fine tune its IP suggestions, how used, where used and searches based on the "quality" of the parts used in the search pages.

In a typical reuse system, a designer would search for circuits which he could reuse. A circuit may exists on a page of a block or may span across multiple pages of a block from the existing designs in a company's database based on certain search criteria. The designer may research the results and identify the reuse portions of the searched designs, blocks, and/or pages. In contrast, embodiments of the present disclosure may be configured to analyze the designer's current WIP design's connectivity as a pattern, and then identify multiple IP suggestions from previously created designs in the company's design database. Suggestions may be based on a connectivity pattern that is close to the user's current design and then allow the designer to reuse portions of existing IP.

For example, consider a company that makes PCs, tablets, cellphones and watches. If a designer was working on a tablet design, and in particular a block revolving primarily around the tablet's memory, electronic design reuse process 10 may present pages from existing designs relating to blocks that deal with tablet memory and have the closest partial connectivity to the designer's current WIP page. The process may be thought of as assigning "context weights" to its IP suggestions. In the above example, a suggested page retrieved from the design database relating to blocks that deal with tablet memory and has the closest partial connectivity to the designer's current WIP page, would have a higher "context weight" than say a page from a memory block of a cell phone design. The IP suggestions may be ordered on the basis of their "context weight."

In some embodiments, the process may analyze at the user's WIP design as "patterns" of connected parts. This may be compared with a plurality of electronic designs that are stored from prior users work. A design from the database that has a connectivity pattern closer to the WIP design would be deemed to have a higher "context weight." A cumulative context weight of a page from the database in relation to a WIP page may be a function of numerous factors some of which may include, but are not limited to, the design connectivity context weight, the block connectivity context weight, the page connectivity context weight, social activities such as "liking/disliking" a page, weights of IP suggestions may factor in the quality of parts used (obsolete parts/ROHS=false/pages containing liked/dislike parts etc.), weights of IP suggestions may factor into the frequency of their reuse, and/or marking sections of a design(s) as IP protected. It should be noted that although certain embodiments included herein focus upon design connectivity information, block connectivity information, and page connectivity information, numerous other types of data and information may also be received, analyzed and/or otherwise processed in accordance with the present disclosure. Some of this information may include, but is not limited to, enrichment data, classification data and technical characteristics (such as electrical, mechanical manufacturing, quality schedule metrics), etc.

Figure 3:
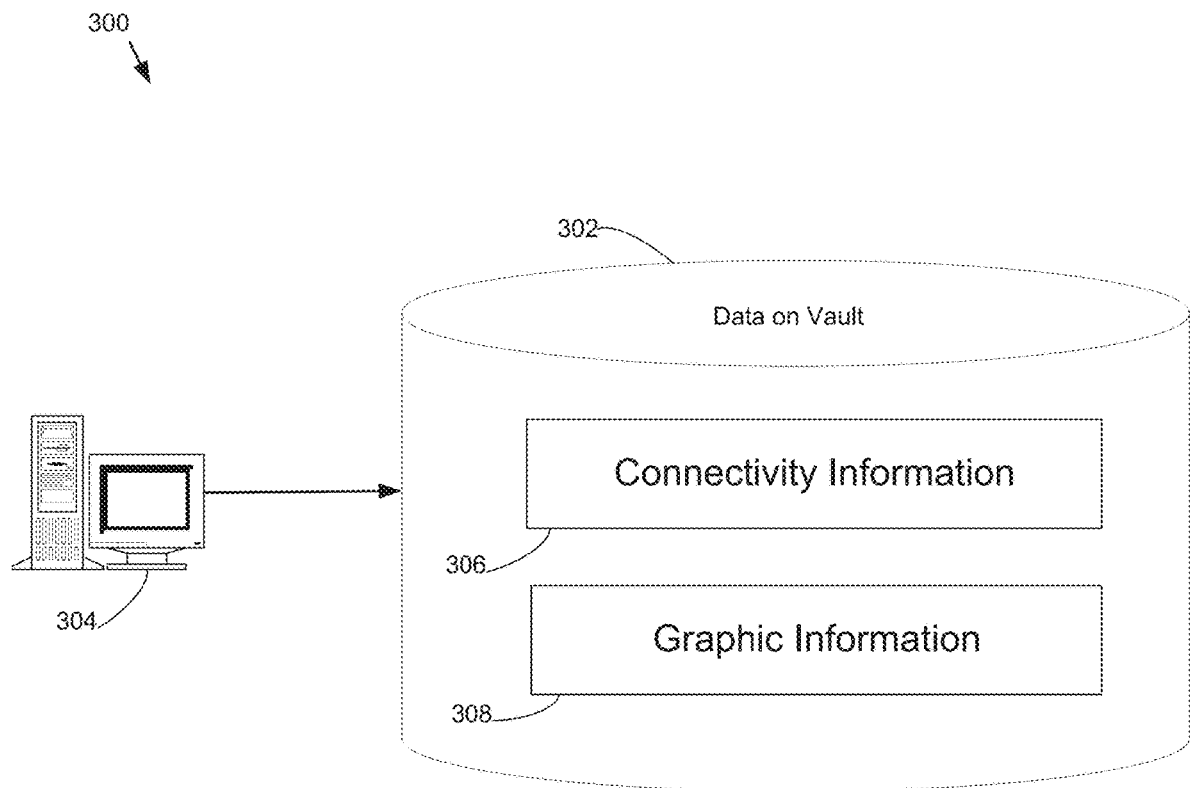
FIG. 3 is a diagram depicting an example of data storage in accordance with an embodiment of the present disclosure.

Referring now to FIG. 3, a diagram depicting an example of design indexing is provided. In operations, when a designer publishes a design to the database 302 using computing device 304, the data may be parsed into two sections, connectivity information 306 and graphic information 308, which may allow for intelligent connectivity indexing and reuse presentation. Regarding connectivity information 306, electronic design reuse process 10 may store design connectivity information 306, block connectivity information, and page connectivity information. These are essentially connectivity patterns that may get matched later when determining a percentage match of a design/block/page connectivity with another design/block/page. Regarding connectivity information 306, electronic design reuse process 10 may break down the design pages into "graphic" information 308. The objects on a page may get collapsed into lines, ellipses, circles, and text and can be stored as "page graphic information" in the database 302.

Figure 4:
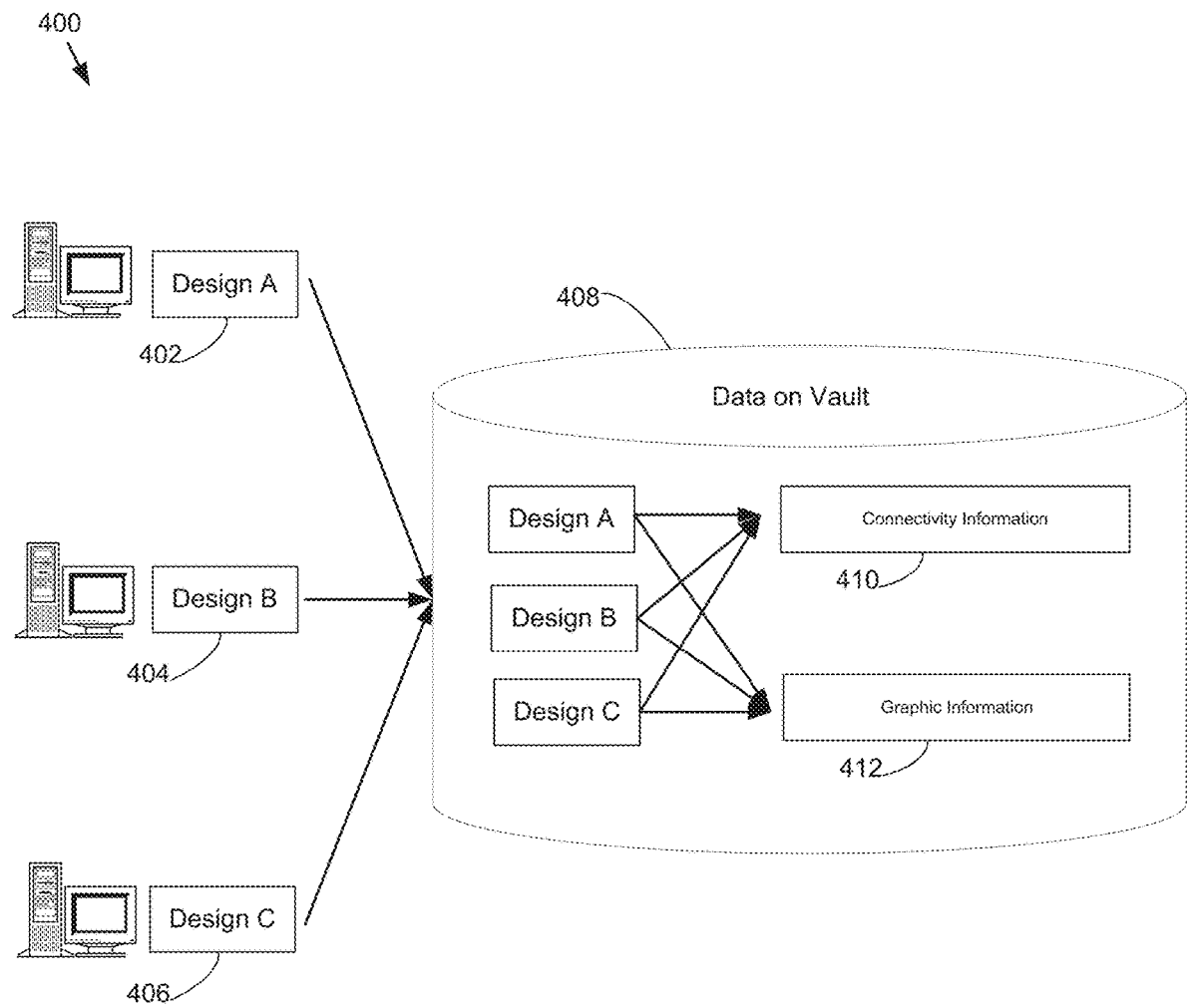
FIG. 4 is a diagram depicting an example of data storage with multiple designs in accordance with an embodiment of the present disclosure.

Referring now to FIG. 4, a diagram depicting an example consistent with embodiments of the present disclosure is provided. When one or more designers publish a design(s) 402, 404, 406 to the database 408, the data may be parsed into two sections: connectivity information 410 and graphic information 412. Thus, allowing for intelligent connectivity indexing and reuse presentation. Regarding connectivity information 410, the present disclosure may store design connectivity information, block connectivity information, and page connectivity information. These are essentially connectivity patterns that may get matched later when determining a percentage match of a design/block/page connectivity with another design/block/page. Regarding connectivity information, electronic design reuse process 10 may break down the design pages into "graphic" information 412. The objects on a page may get collapsed into lines, ellipses, circles, and text and may be stored as "page graphic information" in the database 408.

In some embodiments, connectivity of a design/block/page may be represented as a set of sets. With each set containing a number of packageName.PinNumber elements. For example, for a case where on a page pin 1 of IC package 'A' is connected to pin 2 of IC package B and to pin 3 of IC package C, the connectivity of this page would be the set [A.1 B.2 C.3]. A page may have multiple such connections; hence the page connectivity would be a set of all such sets. Since a block contains a number of pages, the block connectivity would be a union of all the page level connectivity sets. The design connectivity will be the flattened design netlist in terms of the respective packageName.PinNumber connections.

In some embodiments, regarding connectivity distance, for two connectivity sets, percentage match between them is the size of the intersection of the two sets divided by the maximum size of the two sets. For example, the percentage match between two sets A and B; where A=[P.1 Q.2 R.3] and B=[P.1 Q.2 S.1] is as follows:

$$\text{Percentage match strength} = \frac{\text{size of}(A \cap B) * 100}{\max(\text{size of } A, \text{size of } B)}$$

For this simple case, the result is 66 percent since the two nets have 2 out of 3 pin connections that are common between them. A design/block/page however would have a large number of nets hence a large number of sets that would need to be intersected to find out the connectivity match strength between two pages/blocks/designs. The complexity of matching two pages/blocks/designs which have "n" and "m" nets respectively, is "n" time "m". Pattern matching 50 thousand blocks and million pages this way is impossible. The first step in the solution it to create "connectivity clusters" across designs, blocks, and pages.

Figure 5:
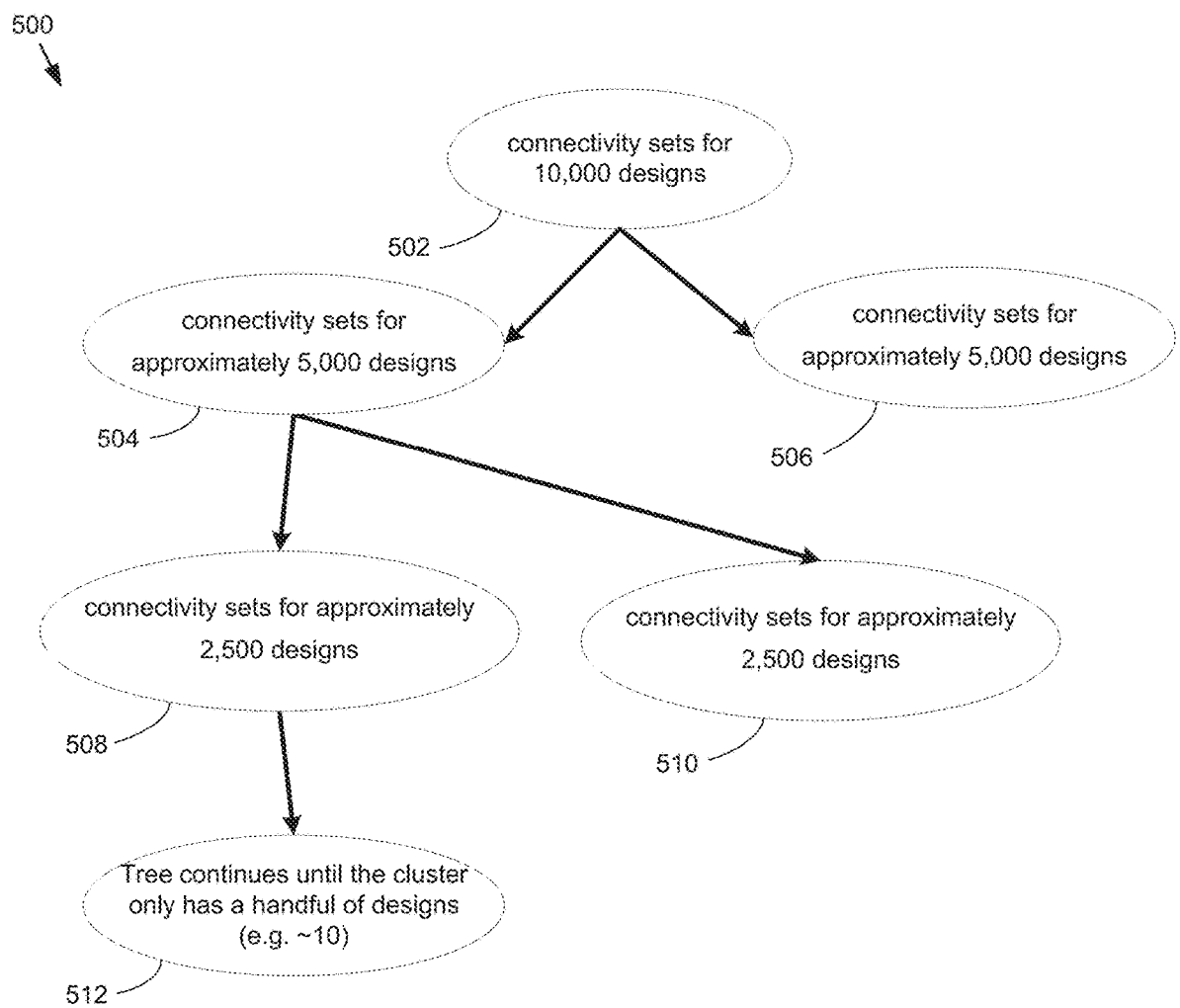
FIG. 5 is a diagram showing a connectivity cluster tree in accordance with an embodiment of the present disclosure.

Referring now to FIG. 5, a flowchart showing clustering consistent with electronic design reuse process 10 is provided. In some embodiments, clustering may essentially group the designs by the closeness of their connectivity patterns to each other. FIG. 5 provides an example assuming 10,000 designs. Matching the connectivity of the WIP design to 10,000 designs is difficult in an acceptable amount of time. Therefore, a hierarchy of design clusters may be created. For example, the 10,000 designs in node 502 may be divided into two clusters of approximately 5,000 designs each (e.g., nodes 504 and 506); in which the designs within node 504 have a higher connectivity match to each other compared to designs from other clusters such as those in the node 506. Each design cluster may have a centroid design identified. The centroid design may include a design whose cumulative distance to all other designs in the specific cluster is the smallest as compared to the other designs in the cluster. The centroid may be considered a "good" representation of the cluster. The 5,000 design clusters may be further divided into smaller and smaller clusters until only a handful of designs (e.g., 10 designs) are left in a cluster. The average closeness of the design connectivity increases as you traverse down the tree to smaller clusters. In creating the clusters and identifying centroid designs that represent a cluster, the connectivity pattern of an incoming WIP design may be matched to a specific centroid of a cluster without having to match the WIP design to all designs in the database. In some embodiments, the actual implementation may have a hierarchy of cluster types. The leaf level nodes of the design cluster tree would point to block cluster trees which would contain the blocks in the cluster and which would be clustered similar to the design cluster tree, Similarly the leaf nodes of the block cluster tree would have page cluster tress which would contain the pages of the blocks in the cluster.

Figure 6:
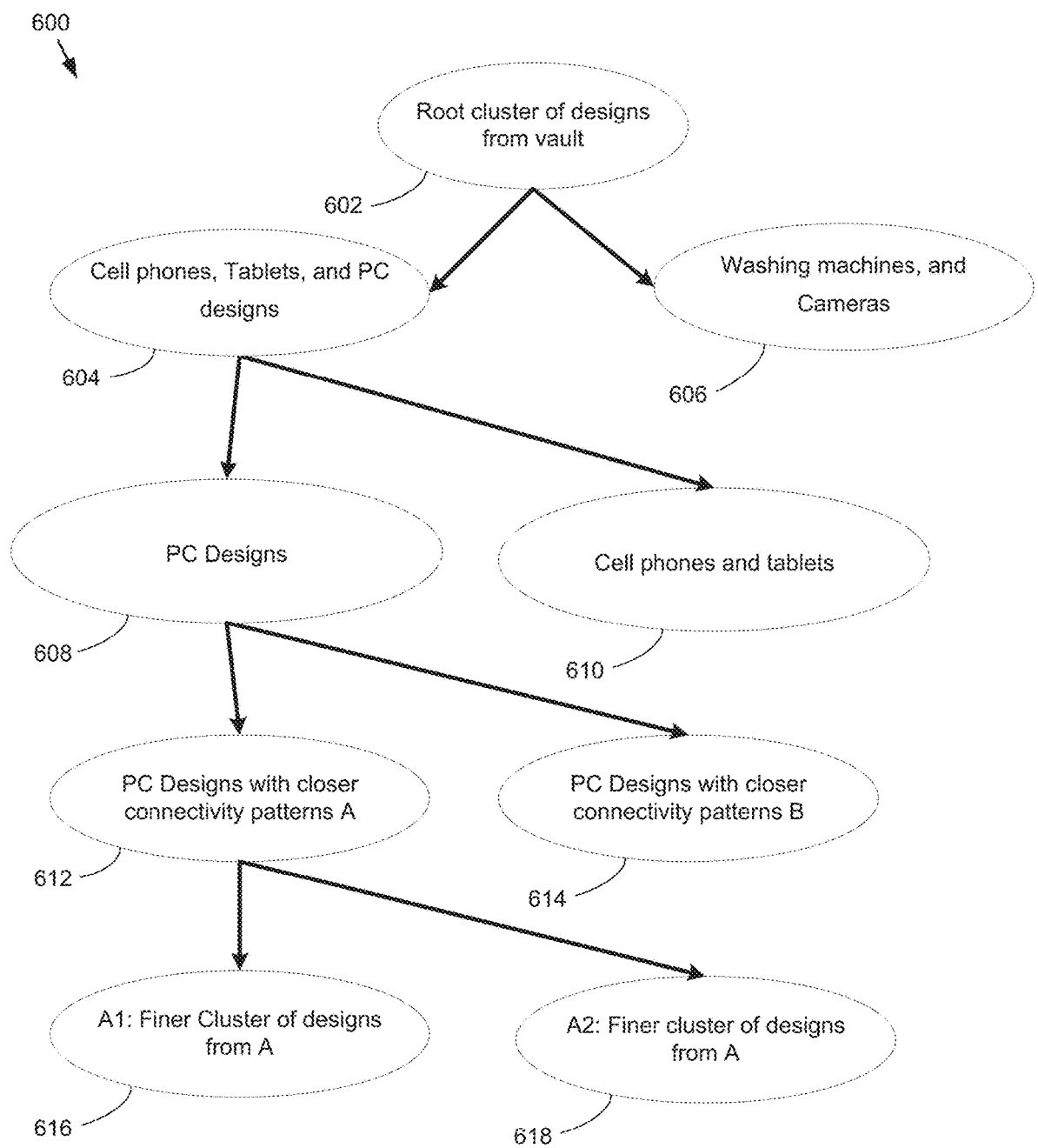
FIG. 6 is a diagram showing a connectivity cluster tree in accordance with an embodiment of the present disclosure.
Figure 7:
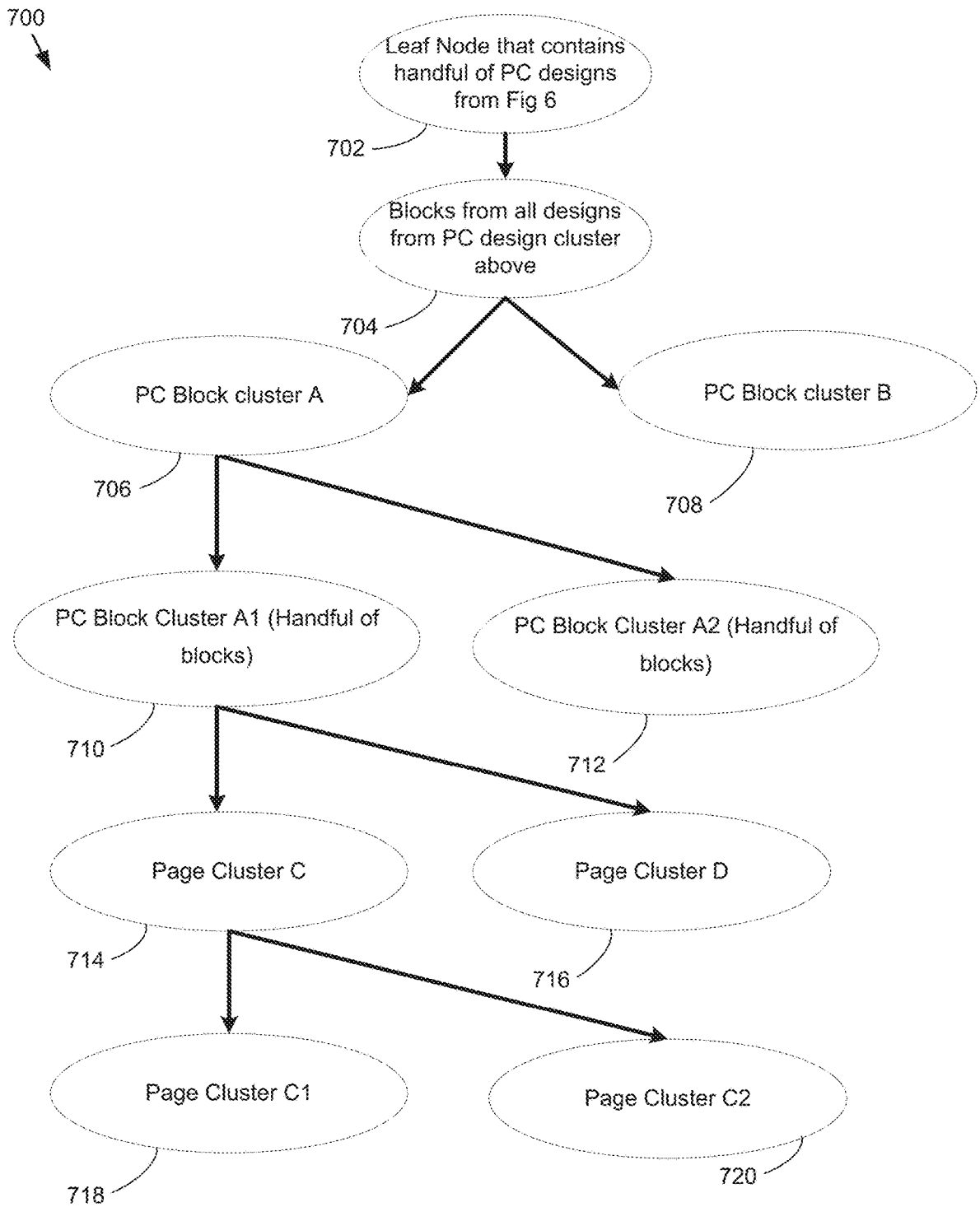
FIG. 7 is a diagram showing a block and page connectivity cluster tree in accordance with an embodiment of the present disclosure.

Referring now to FIGS. 6 and 7, an example of a design, block and page cluster tree is provided. The goal is to cluster designs into smaller groups that are closer in their connectivity patterns as compared to other designs in the database. For example, if a company makes cellphones, tablets, PCs, washing machines and cameras; the designs in a company database may get clustered as per the cluster shown in FIG. 6. As seen in the Figure, a root cluster of designs 602 from the database may be divided into clusters "cell phones, tablets, and PC designs" cluster 604 and "Washing machines and cameras" cluster 606. The "cell phones, tablets, and PC designs" cluster 604 may then be divided into "PC designs" cluster 608 and "Cell phone and tablets" cluster 610. The PC designs cluster may then be dived into "PC Designs with closer connectivity patterns A" 612 and "PC Designs with closer connectivity patterns B" 614. This may then be divided into "A1: Finer Cluster of designs from A" 616 and "A2: Finer Cluster of designs from A" 618. Each design cluster will have a centroid design calculated. The centroid design may refer to a design whose cumulative distance to all other designs in the specific cluster is the smallest as compared to the other designs in the cluster. The clustering of designs may continue into finer clusters until an identified number of designs is left in leaf level cluster. The number of designs may be chosen by a user or be a function of the average proximity of the designs in a cluster node and the total number of designs in the database. To find the design(s) that are closest in their connectivity pattern to a WIP design, the system may recursively traverse down the design cluster tree by pattern matching the WIP design's connectivity pattern to the centroid at each level in the design connectivity tree and then traversing those tree nodes whose connectivity patterns are closer to the WIP design. This would continue till the system reaches a left design cluster Referring now to FIG. 7, a cluster tree consistent with electronic design reuse process 10 relating to block connectivity clusters is provided. Once the designs from the database that are closest in their connectivity pattern to the WIP design have been identified, the blocks that are closest in their connectivity pattern to the WIP block may be identified in a fashion similar to that done using the design connectivity tree. Furthermore, once the blocks closest in their connectivity pattern to the WIP block are identified, the pages closest in their connectivity pattern to the WIP page may also be identified in a similar fashion by matching the WIP page connectivity to the centroids of the page clusters and traversing down the page cluster tree to find the closest matching pages. These pages may then be presented to the designer as suggestions for IP reuse. In this particular example, leaf node 702 is a node that contains a handful of PC designs from FIG. 6. Leaf node 704, which contains blocks from all designs from PC design cluster above, may then be divided into "PC Block cluster A" and "PC Block cluster B"; in which the designs within "PC Block cluster A" 706 have a higher connectivity proximity to each other compared to designs from other clusters such as those in the "PC Block cluster B" 708. The "PC Block cluster A" 706 may then be divided into "PC Block Cluster A1 (Handful of blocks)" 710 and "PC Block Cluster A2 (Handful of blocks)" 712. The respective PC Block clusters A1 and A2 may then be divided into page clusters using the same methodology. For example, "PC Block Cluster A1 (Handful of blocks)" 710 may be divided into "Page Cluster C" 714 and "Page Cluster D" 716. Then, "Page Cluster C" 714 may be divided into "Page Cluster C1" 718 and "Page Cluster C2" 720.

Figure 8:
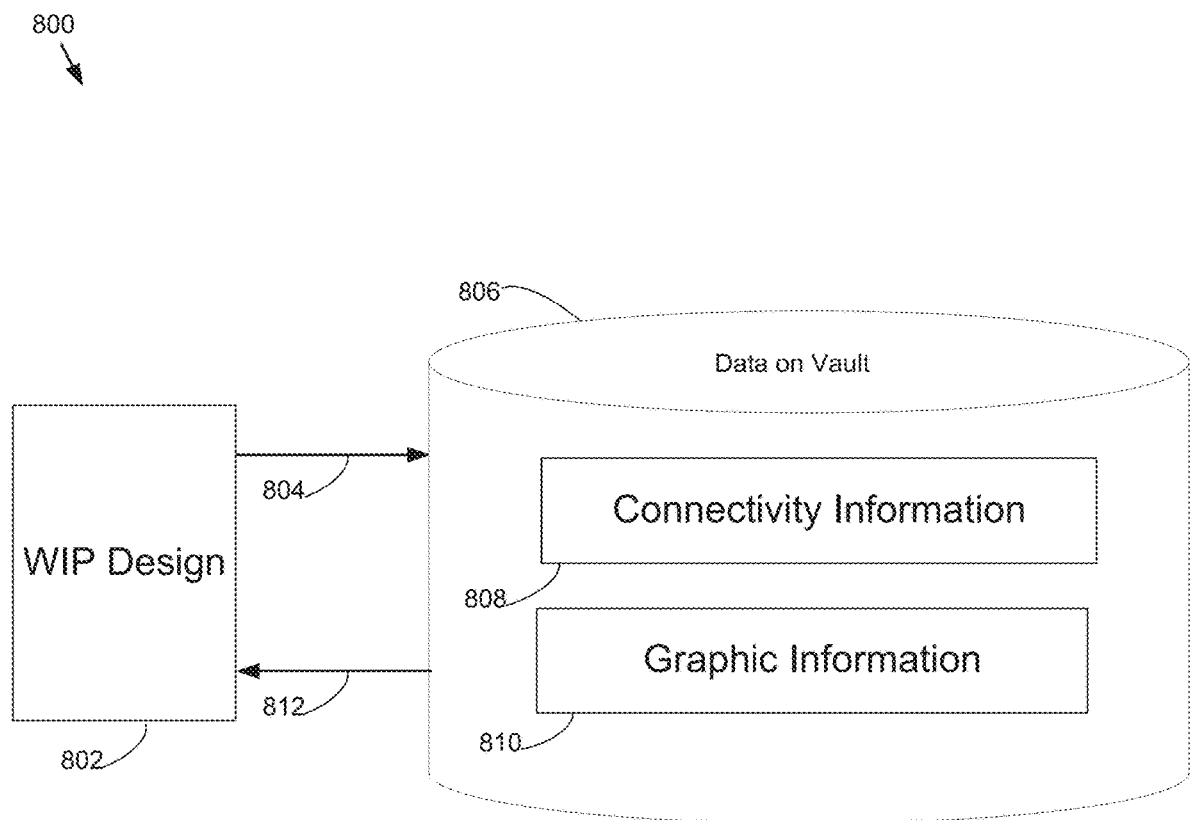
FIG. 8 is a diagram depicting an example reuse request and result process in accordance with an embodiment of the present disclosure.

Referring now to FIG. 8, a diagram depicting an example reuse request and result process is provided. In operations, when a designer is interested in seeing possible reuse suggestions for WIP design 802, a request 804 may be sent with WIP design connectivity, the current WIP block connectivity, and WIP page connectivity from the WIP project to the database 806. Electronic design reuse process 10 may analyze the connectivity(s) information 808 for possible closest matches. The process may then match the WIP design connectivity to the centroids of design clusters. The design cluster tree may be traversed based on the closeness of the WIP design to either of the two centroids at a leaf node level to find the leaf design cluster that the WIP design is closest to.

In some embodiments, electronic design reuse process 10 may similarly drill down the block connectivity cluster tree of a leaf design cluster by pattern matching the incoming WIP block connectivity with the centroid of the blocks in the tree above to reach a leaf block cluster. Once the leaf block cluster is reached, electronic design reuse process 10 may match the WIP page connectivity with the centroid of the page cluster tree for this leaf block cluster and find a handful of pages that have the closest connectivity to the incoming WIP design, block and page connectivity. Likely reuse matches may then be presented back to the designer. Graphical information 810 may be shown in any suitable approach, for example, as a list of pages or as a carousel at the graphical user interface.

Figure 9:
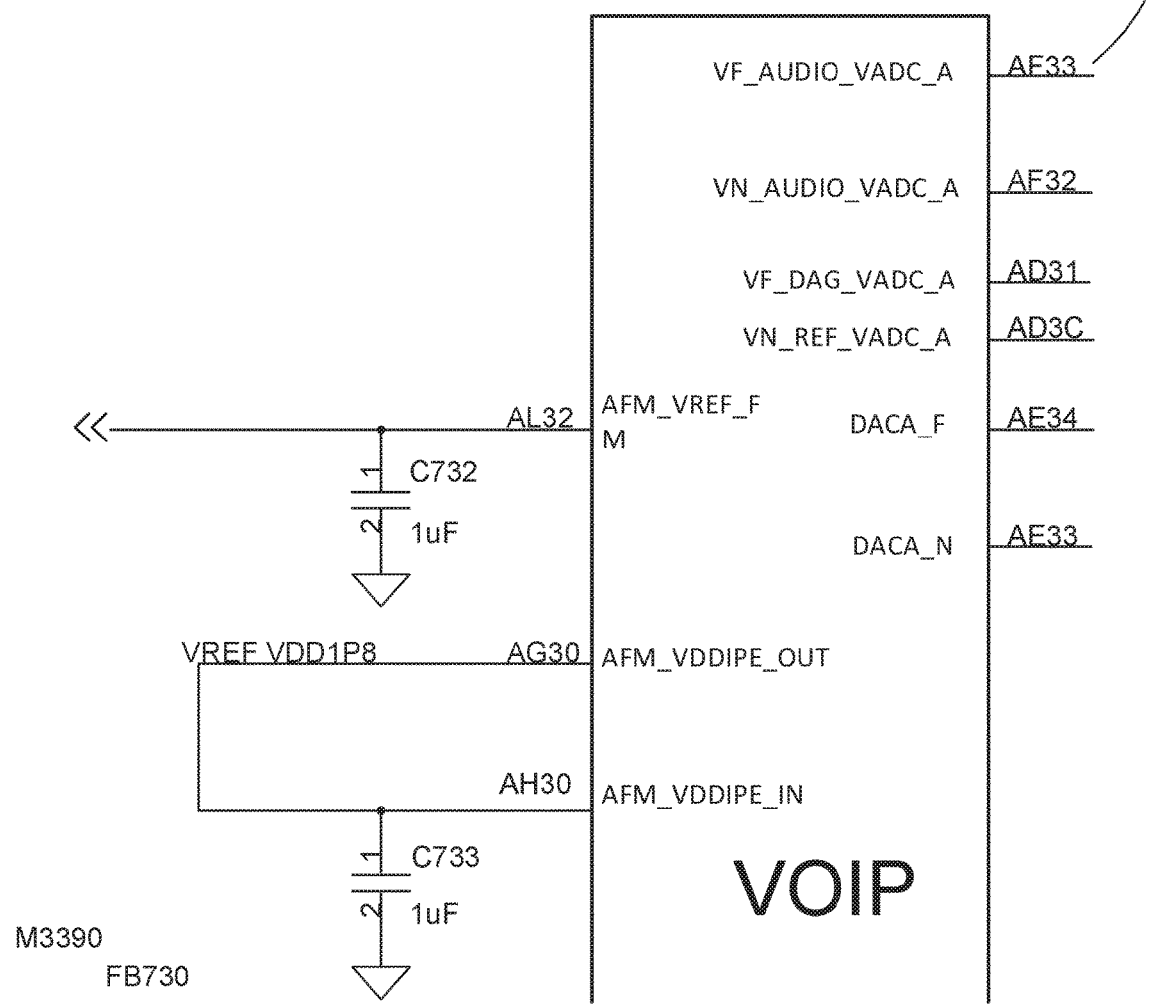
FIG. 9 is a diagram depicting an example showing pin connectivity suggestions in accordance with an embodiment of the present disclosure.
Figure 10:
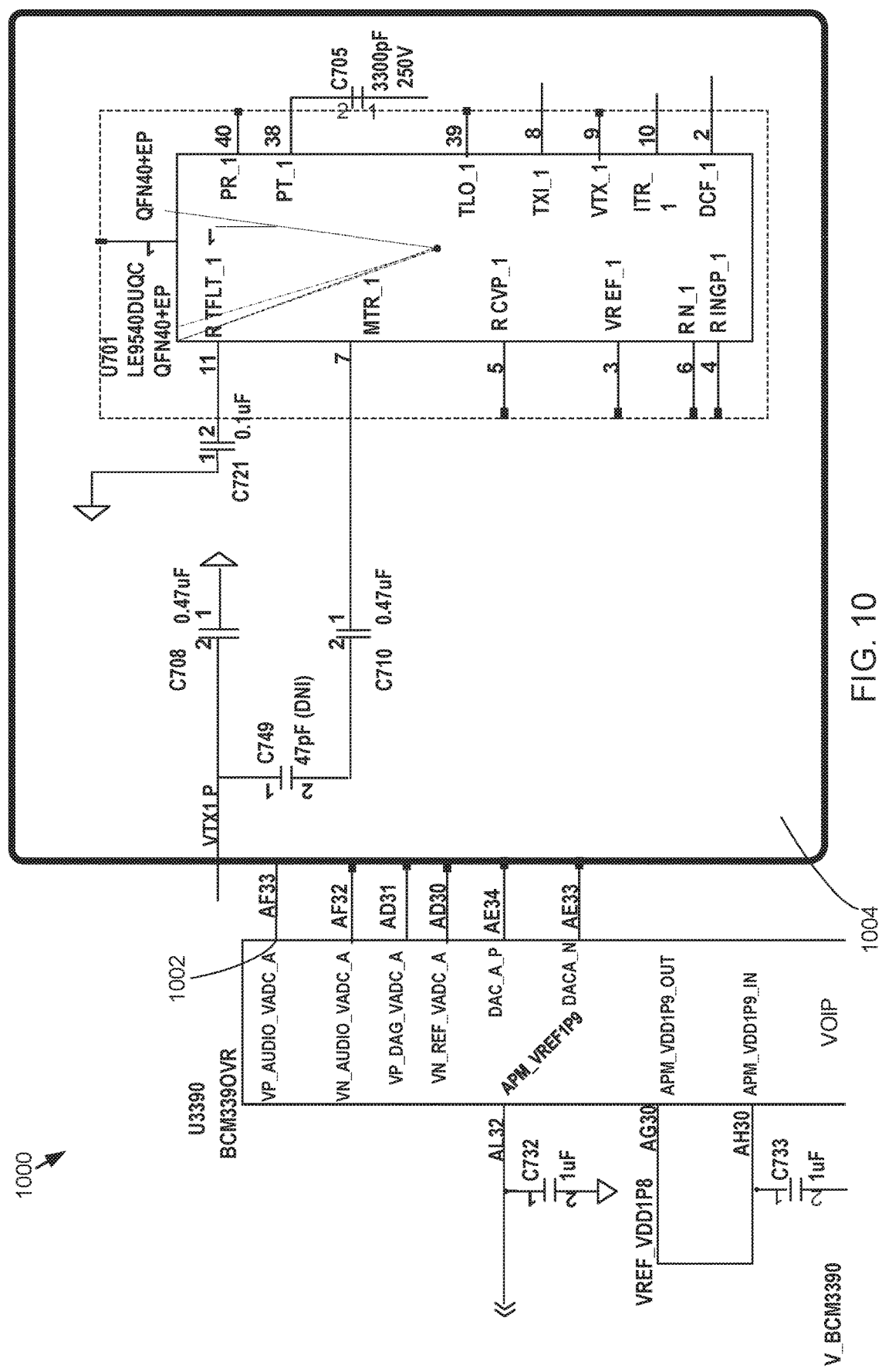
FIG. 10 is a diagram depicting an example showing pin connectivity suggestions in accordance with an embodiment of the present disclosure.

Referring now to FIG. 9, a diagram showing pin connectivity suggestions at a graphical user interface is provided. Apart from retrieving pages from the design database that contain work that is closer to the designer's current WIP design/page, the process may be built that may, given a pin of a part of the designer's WIP page, present connectivity suggestions for the selected pin based on previous designs with the closest connectivity patterns to the current WIP design/page. For example, if the designer is building a PCB design for a media server, and wants connectivity suggestions for the pin 902 in FIG. 9, the designer may be presented with multiple circuit suggestions from existing designs in the database that show how the pin was connected as shown in FIG. 10 at connection 1002. In operation, circuit 1004 may be generated and displayed as a suggested circuit. Because all suggestions may be weighted, and the designer is building a media server, circuits from designs that serve media will be shown first. Furthermore, the user may be able to use arrow keys to toggle through the other circuit suggestions.

In some embodiments, the primary factor influencing the order of IP suggestions may be the closeness of connectivity of the WIP design/page to the database's design/page. However, it should be noted that the following factors may also influence the order of suggestions, for example, pages that contain previously reused IP by similar WIP designs in the past, whether or not the database design/block/page has received positive comments from the designers (e.g., positive would bump up the suggestion, negative would bump down), whether or not the parts on the page from the database have received positive or negative comments, whether or not the page from the database has parts that are of good "quality" (e.g., a part with ROHS=false may be deemed as lower in quality), and/or classification of the parts used in the WIP and the database design. The classification of parts may be particularly useful in the case of a designer using parts that have not been previously used. Designs/pages matched using part classifications would have lesser weights than those matched using package names.

Figure 11:
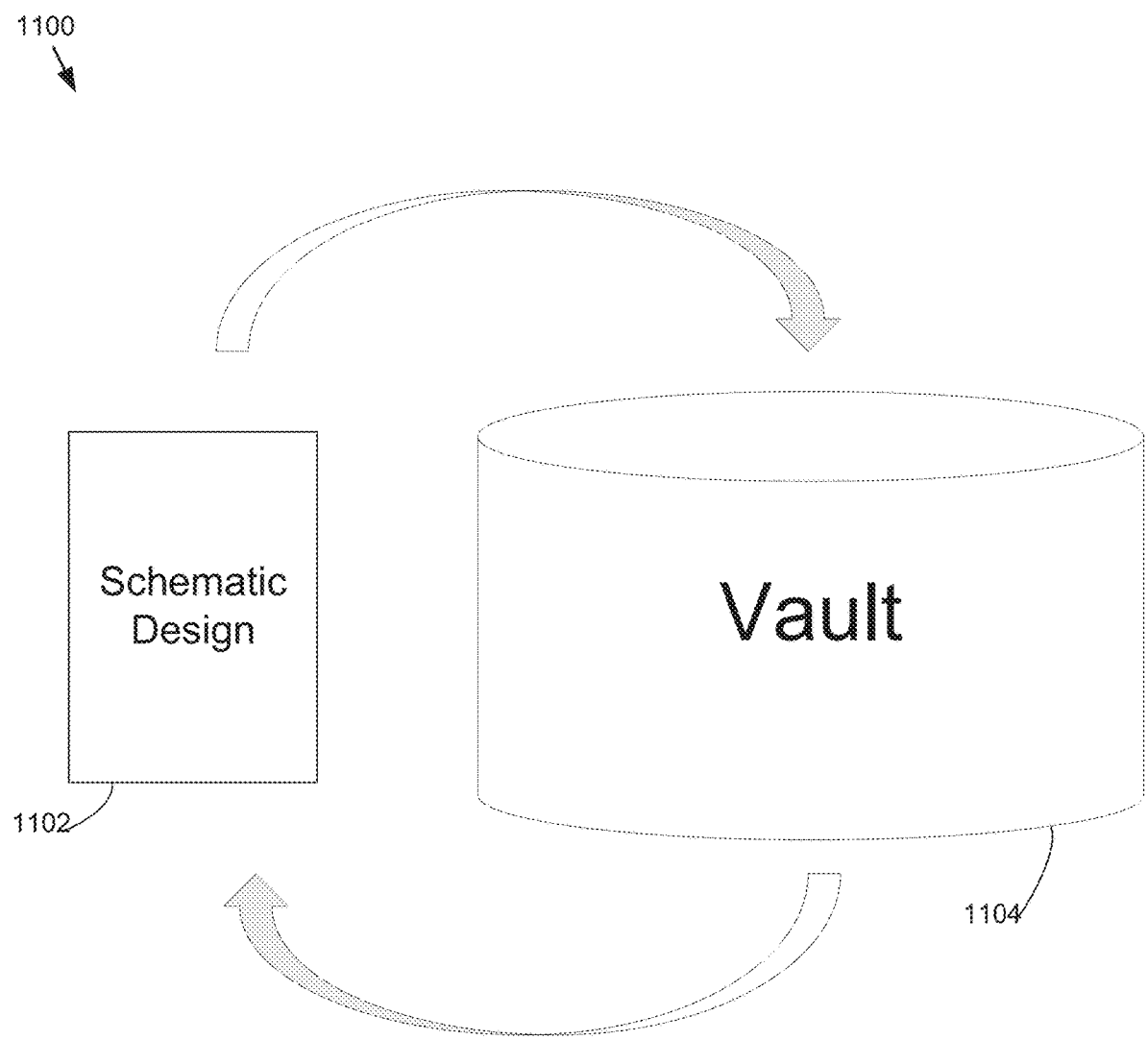
FIG. 11 is a diagram depicting an example showing traceability of reused IP in accordance with an embodiment of the present disclosure.

Referring now to FIG. 11, a diagram depicting an example showing the traceability of reused IP is provided. The system may maintain information about reused IP. For example, if a reused IP is modified in the database 1104, a designer may be notified of the change so that they can make a decision with respect to updating their WIP design 1102 with the updated IP.

Figure 12:
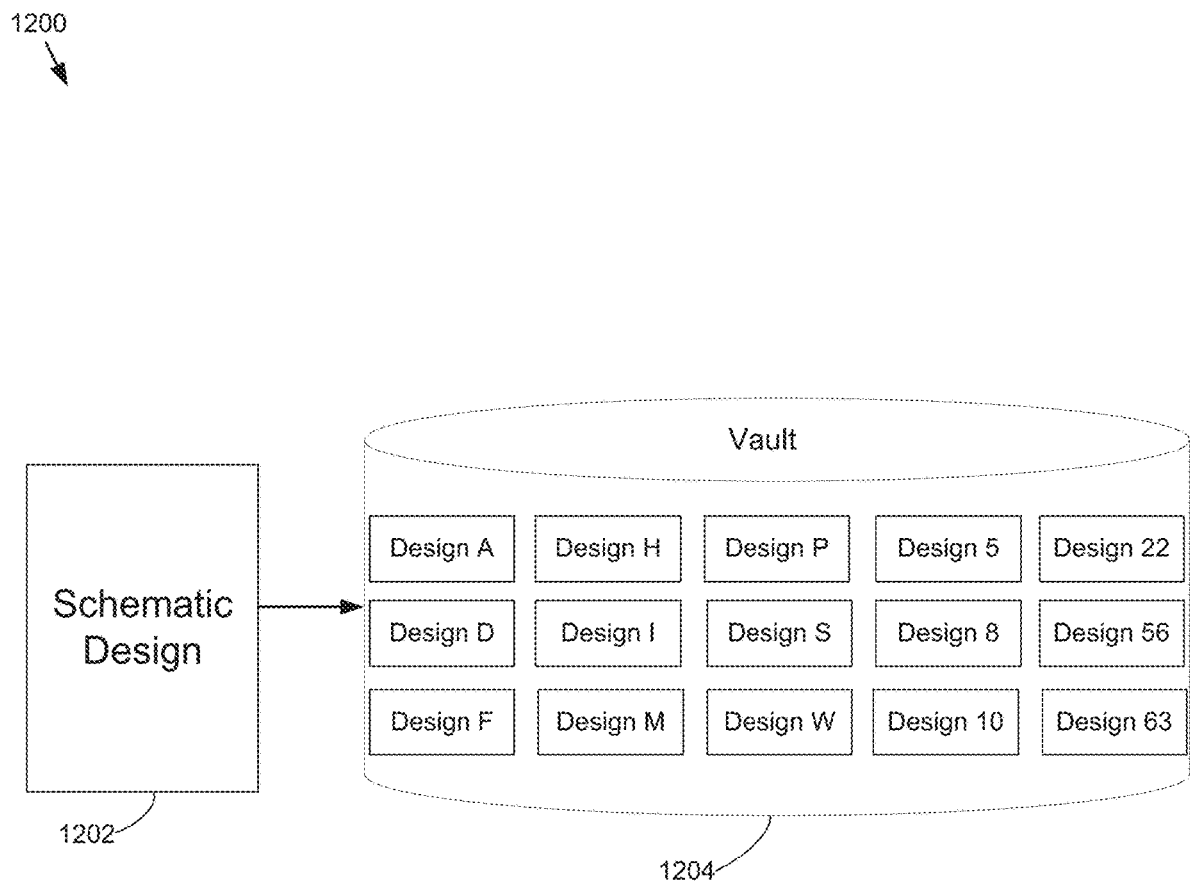
FIG. 12 is a diagram depicting an example of a "Where Used" and free text search functionality in accordance with an embodiment of the present disclosure.

Referring now to FIG. 12, a diagram depicting an example of a "Where Used" and free text search functionality is provided. Again, in this example a designer may be working on a particular schematic design 1202 and may wish to communicate with database 1204. The process may provide for a "Where Used" and a free text search functionality. In this example, a designer may be able to search based on a text string and reuse existing IP from the list of pages searched. The results of such searches may be ordered on the basis of the type of comments the database pages have received, and the quality of parts contained in them.

Embodiments of the present disclosure may include other functionalities some of which may include, but are not limited to, apart from a single pin as described above, the designer may be able to select a WIP part and obtain connectivity suggestions for all of its pins, a user may be able to reuse a portion of a page, a complete page, a complete block, a set of pages from the block, or a complete design form the database. Additionally and/or alternatively, the process may show parts of a lower quality (e.g., obsolete=true for example) in a different color, and may not allow/warn users while copying such IP. A user may also be able to mark designs/blocks/pages/regions as IP protected so that these may not be reused by the designers or a certain group of designers. This may be particularly useful to ODM companies.

The present disclosure may also have backend infrastructure to extend the system to support design markups. Furthermore, part properties and variant data may be viewed as "patterns" that exist within larger "patterns". Apart from connectivity, the functionality of this disclosure may be extended to other parts of the PCB design.

It should be noted that although certain embodiments included herein may reference machine learning or genetic algorithms, any analysis process may be used in accordance with the teachings of the present disclosure. For example, any evolutionary algorithm, genetic algorithm, genetic program, grouping genetic algorithm, evolutionary computing approach, metaheuristics, stochastic optimization, optimization approach, artificial intelligence technique, etc. may be used (e.g. in the analyzing and updating described herein) without departing from the teachings of the present disclosure.

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:

1. A computer-implemented method comprising:
   receiving, using at least one processor, a plurality of distinct electronic designs at an electronic design database;

storing the plurality of distinct electronic designs at the electronic design database;

receiving a request to reuse one electronic design of the plurality of distinct electronic designs from a client electronic device associated with a user, wherein the request includes information selected from a group consisting of: design connectivity information, block connectivity information, and page connectivity information;

analyzing one or more of the design connectivity information, block connectivity information, and page connectivity information to identify one or more closest matches with the plurality of distinct electronic designs, wherein the one or more closest matches are based upon a percentage match between a first connectivity set and a second connectivity set, wherein the percentage match is based upon, at least in part, a size of an intersection between the first connectivity set and the second connectivity set; and providing the one or more closest matches to the client electronic device to allow for subsequent displaying at a graphical user interface, wherein the displaying includes providing an option to accept or reject the one or more closest matches at the client electronic device;

monitoring whether the one or more closest matches are accepted or rejected at the client electronic device; and updating an identification of the one or more closest matches based upon, at least in part, the monitoring.

2. The computer-implemented method of claim 1, wherein the design connectivity information, block information, and page connectivity information is based upon, at least in part, a work in progress design associated with the user.

3. The computer-implemented method of claim 1, wherein identifying one or more closest matches is based upon, at least in part, one or more parts that are not located in the plurality of distinct electronic designs.

4. The computer-implemented method of claim 1, wherein identifying one or more closest matches is based upon, at least in part, page connectivity information that is not located in the plurality of distinct electronic designs.

5. The computer-implemented method of claim 1, further comprising: allowing the user to provide feedback regarding the one or more closest matches at the graphical user interface.

6. The computer-implemented method of claim 5, further comprising: updating the identification based upon, at least in part, the feedback.

7. A non-transitory computer-readable medium having stored thereon instructions that when executed by a processor result in one or more operations, the operations comprising:

receiving, using at least one processor, a plurality of distinct electronic designs at an electronic design database;

storing the plurality of distinct electronic designs at the electronic design database;

receiving a request to reuse one electronic design of the plurality of distinct electronic designs from a client electronic device associated with a user, wherein the request includes information selected from a group consisting of: design connectivity information, block connectivity information, and page connectivity information;

analyzing one or more of the design connectivity information, block connectivity information, and page connectivity information to identify one or more closest matches with the plurality of distinct electronic designs, wherein the one or more closest matches are based upon a percentage match between a first connectivity set and a second connectivity set, wherein the percentage match is based upon, at least in part, a size of an intersection between the first connectivity set and the second connectivity set;

providing the one or more closest matches to the client electronic device to allow for subsequent displaying at a graphical user interface, wherein the displaying includes providing an option to accept or reject the one or more closest matches at the client electronic device;

monitoring whether the one or more closest matches are accepted or rejected at the client electronic device; and updating an identification of the one or more closest matches based upon, at least in part, the monitoring.

8. The computer-readable medium of claim 7, wherein the design connectivity information, block information, and page connectivity information is based upon, at least in part, a work in progress design associated with the user.

9. The computer-readable medium of claim 7, wherein identifying one or more closest matches is based upon, at least in part, one or more parts that are not located in the plurality of distinct electronic designs.

10. The computer-readable medium of claim 7, wherein identifying one or more closest matches is based upon, at least in part, page connectivity information that is not located in the plurality of distinct electronic designs.

11. The computer-readable medium of claim 7, further comprising: allowing the user to provide feedback regarding the one or more closest matches at the graphical user interface.

12. The computer-readable medium of claim 11, further comprising: updating the identification based upon, at least in part, the feedback.

13. A system comprising:

at least one processor;

a computing device configured to receive, using the at least one processor, a plurality of distinct electronic designs at an electronic design database, the computing device further configured to store the plurality of distinct electronic designs at the electronic design database, the computing device further configured to receive a request to reuse one electronic design of the plurality of distinct electronic designs from a client electronic device associated with a user, wherein the request includes information selected from a group consisting of: design connectivity information, block connectivity information, and page connectivity information, the computing device further configured to analyze one or more of the design connectivity information, block connectivity information, and page connectivity information to identify one or more closest matches with the plurality of distinct electronic designs, wherein the one or more closest matches are based upon a percentage match between a first connectivity set and a second connectivity set, wherein the percentage match is based upon, at least in part, a size of an intersection between the first connectivity set and the second connectivity set, the computing device further configured to provide the one or more closest matches to the client electronic device to allow for graphical display of the one or more closest matches, wherein the displaying includes providing an option to accept or reject the one or more closest matches at the client electronic device, the computing device further configured to monitor whether the one or more closest matches are accepted or rejected at the client electronic device and to update an identification of the one or more closest matches based upon, at least in part, the monitoring.

14. The system of claim 13, wherein the design connectivity information, block connectivity information, and page connectivity information is based upon, at least in part, a work in progress design associated with the user.

\* \* \* \* \*